March 5, 1935. J. M. CROWE 1,993,338
EGG BEATER AND CREAM WHIPPER
Filed May 13, 1932
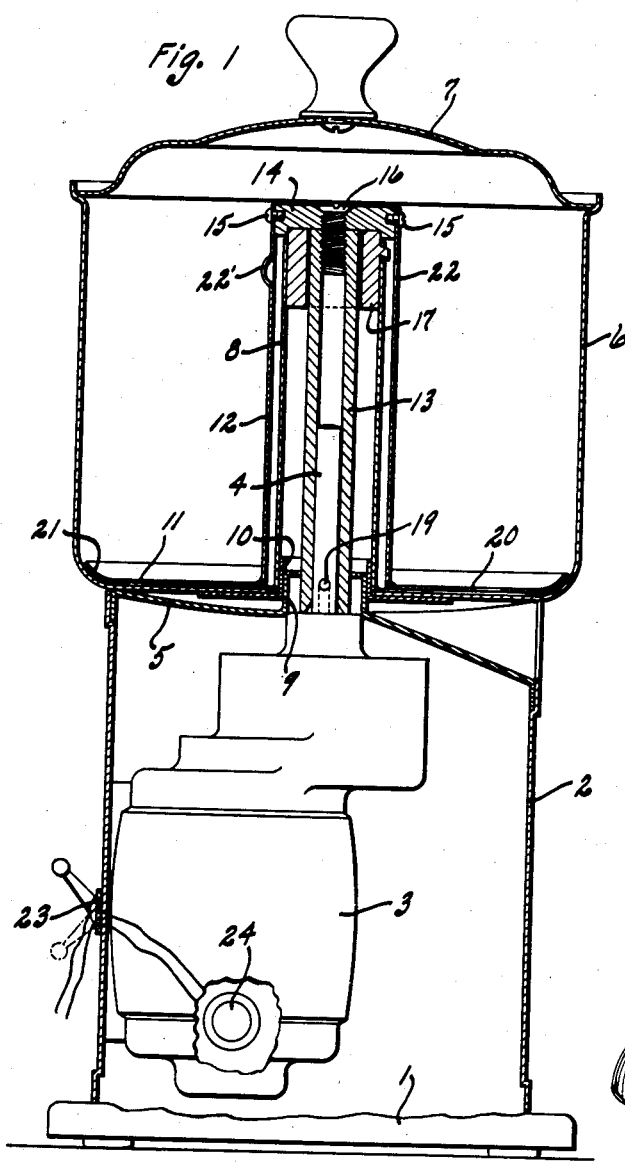
Fig. 1
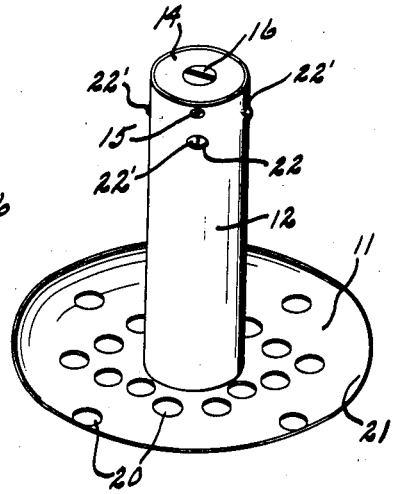
Fig. 2
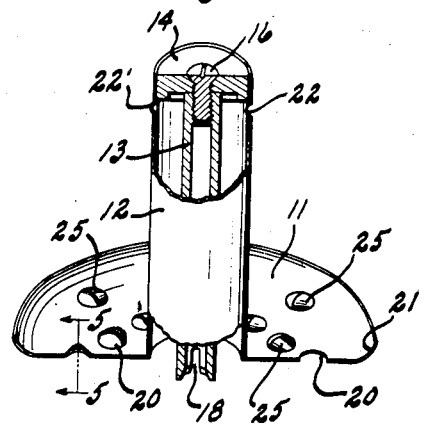
Fig. 3
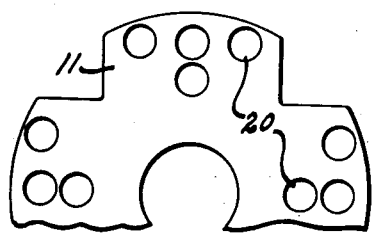
Fig. 4
Fig. 5
INVENTOR
John M. Crowe
BY Brockett, Hyde, Higley & Meyer
ATTORNEYS Patented Mar. 5, 1935

1,993,338

UNITED STATES PATENT OFFICE 1,993,338

EGG BEATER AND CREAM WHIPPER

John M. Crowe, Covington, Ky., assignor to Fruit Juice Machine Company, Cincinnati, Ohio, a corporation of Delaware Application May 13, 1932, Serial No. 611,053

2 Claims. (Cl. 259—96)

My invention relates to a power operated cream whipper, egg beater, or the like, and particularly, to a power driven apparatus designed to agitate cream, eggs, or the like while, at the same time, intermixing a maximum amount of air with the cream or eggs to ultimately produce a relatively light, fluffy mass.

The process of producing what is commonly termed as "whipped cream" or the process of beating eggs to produce a light, fluffy egg substance is that of violently agitating the cream or eggs to break them up into very fine particles and, at the same time, intermixing a maximum amount of air therewith, it being known that the degree of fluffiness of the product resulting from violent agitation of cream or eggs is directly proportional to the fineness to which the cream or eggs are broken up and the amount of air intermixed therewith. Therefore, it is the object of my invention to provide a power operated apparatus to produce substances of the greatest possible lightness and fluffiness from cream or eggs.

Various other objects and advantageous features of my invention will be seen in the following description and one embodiment thereof may be seen in the accompanying drawing wherein similar characters of reference designate corresponding parts, and wherein:

Fig. 1 is a sectional elevation of a cream whipping or egg beating apparatus constructed in accordance with my invention; Fig. 2 is a perspective view of the power driven rotor or agitator element forming a part of my device; Fig. 3 is a perspective view of a modified form of rotor or agitator element, the perforations therein being backed by up-turned lips or the like to increase the amount of substance and air passing downwardly through the rotor or agitator; Fig. 4 is a top plan view of still another modified form of rotor or agitator; and Fig. 5 is a sectional view taken on line 5—5 of Fig. 3.

Referring to the drawing, I have shown the base and power portion of the apparatus shown in my copending application, Serial No. 607,750, filed April 27, 1932, for a Fruit juice extractor and comprising, a base 1, a vertical cylindrical casing 2 and a motor or power unit 3 within the casing 2. The top of the casing 2 slopes downwardly from the edges toward the center except for one trough-like portion which slopes downwardly from the center to the outer edge of the casing whereby this bottom portion of the apparatus is adapted for use either with my fruit juice extractor or the apparatus forming the subject matter of this application, interchangeably. As in the above application, a drive shaft 4 extends upwardly through the top portion 5 of the casing 2 whereby a driving connection may be made between the power means 3 and apparatus disposed on the top of and associated with the casing 2.

In accordance with this invention, the apparatus provided is for "whipping" cream or beating eggs to produce light fluffy substances by breaking up the cream or eggs into fine particles and intermixing air therewith. As shown in Fig. 1, the apparatus consists of a casing 6 having a cover or lid 7 and an upstanding hollow tubular central portion 8 ending at a level, in this instance, slightly below the top of the casing 6. This central tubular portion 8 is adapted to fit over an upstanding annular boss 9 on the top 5 of the casing 2 and which surrounds the drive shaft 4. A reinforcing means 10 may be provided on the casing 6 if desired. Thus, the casing 6 may be assembled with the casing 2 with the casing 6 being supported on the outer edges of the casing 2 and prevented from lateral movement by the tubular portion 8 surrounding the annular boss 9 on the cover 5 of the casing 2.

The apparatus also comprises a rotatable agitator having a dasher portion 11 and an upstanding central tubular portion 12 adapted to fit over the tubular portion 8 of the casing 6 as shown in Fig. 1 and having driving connection with the shaft 4 by means of an internal sleeve 13 rigidly connected by means of screws or the like 16 to a head 14 that is held in the upper end of the tubular portion 12 by screws 15 or otherwise. A block or the like 17 fitted in the uppermost end of the tubular portion 8 acts as a bearing for the head portion 14 in the tubular portion of the agitator, whereby the dasher portion 11 thereof may be held above the bottom of the casing 6, and as a centering means for the agitator to hold the tubular portion 12 spaced at its sides and bottom from the tubular portion 8. The sleeve portion 13, when the parts are in assembled relation as shown in Fig. 1, extends down over the shaft 4 and is operatively connected thereto by means of slots 18 in the bottom of the sleeve portion cooperating with a pin 19 extending radially outwardly from the shaft 4. Thus, the agitator disposed in the casing 6 is operatively connected to the power unit so that it may be rotated thereby.

As shown in Figs. 1 and 2, the dasher portion 11 is disposed a short distance above the casing 6 and is provided with a plurality of openings 20. As shown in Figs. 1 and 2 the dasher 11 is preferably annular and has a flat bottom and up-turned edge portions 21. However, it may take other desired forms in some instances as, for example, is shown in the modified form in Fig. 4 wherein the bottom of the dasher is of segmental form. In other words, the shape of the bottom portion of the agitator may be governed by convenience. The central tubular portion 12 of the agitator is provided with a plurality of openings 22, the number and disposition of these openings being optional, but they are preferably located adjacent the top of the tubular portion and provided with outwardly extending vanes or lips 22' for reasons hereinafter described.

In the operation of this apparatus, the substance to be whipped or beaten as the case may be is placed in the casing 6, the parts of the apparatus having first been assembled in the manner shown in Fig. 1 and as hereinbefore described, and then the motor or power unit 3 is placed in operation, by means of a suitable switch 23 and a speed control rheostat or the like 24, to rotate the agitator. Such rotation of the agitator will violently agitate the substance in the casing 6 with the substance flowing from one side of the horizontal or dasher portion of the agitator through the openings 20 to the other.

The peculiar construction of the dasher 11, with the openings therein and the up-turned edges results in the substances being agitated flowing downwardly through the openings 20 in the dasher bottom and thence outwardly toward the casing sides where they fall or fold inwardly and onto the dasher and then pass downwardly again through the openings 20, this cyclic action taking place continually while the agitator is in operation. As shown in Fig. 1, the dasher is preferably positioned with its outer edges 21 spaced from the side walls of the casing 6 a distance substantially equal to the spacing between the dasher bottom and the bottom of the casing 6. At the same time, operation of the agitator will result in air being directed into the tubular portion through the openings 22 by the lips or vanes 22' whereby currents are set up to force such air downwardly and beneath the horizontal portion of the agitator to be intermixed with the substance flowing through the openings 20 in its bottom as hereinbefore described. This construction causes a maximum amount of air to be intermixed with a substance while, at the same time, the substance is being violently agitated, moved in a cycle path through the dasher and into contact with the air stream flowing downwardly through the tubular portion 12, and broken up into very fine particles. Of course, the texture and fluffiness of the substance resulting may be governed by controlling the speed of operation of the agitator 11 which automatically controls the air currents hereinbefore described and the degree of breaking up of the substances in fine particles.

Referring to Fig. 3 of the drawing, I have shown a modified form of agitator wherein the openings 20 in the dasher portion as well as the openings 22 in the central tubular portion are backed by vanes, lips, or the like 25 that extend upwardly in the direction of rotation of the agitator. These vanes, lips, or the like, as will be apparent, serve to increase the flow of substance and air through the openings 20 and 22 respectively and thus enhance the whipping or beating operation by correspondingly decreasing the length of operating time necessary to produce a whipped or beaten substance of a given texture and fluffiness. In other words, these baffles or the like, act as vanes to direct the flow of substance and air in and around the agitator.

Referring to the drawing and the preceding description, it will be seen that I have provided an apparatus for what is commonly termed as whipping or beating cream, eggs or the like wherein it is possible to produce the finished substance in a minimum of time. This is due to the fact that I have provided an apparatus wherewith substance may be violently agitated and broken up to a very fine degree in a minimum space of time while, at the same time, intermix a maximum amount of air therewith. Various other advantages will be readily apparent.

What I claim is:

1. Apparatus of the character described comprising a receptacle, an agitator therein, means for rotating said agitator, said agitator including a substantially flat radially extending dasher portion spaced from the receptacle bottom, said dasher portion having distributed openings therethrough, means for directing material upwardly adjacent the periphery of the dasher whereby said material flows inwardly and downwardly through said openings, a tubular portion extending upward centrally of said dasher portion, and said tubular portion having air admitting openings adjacent the top thereof and forming an air passage adapted to direct a current of air beneath said dasher portion, whereby on rotation of said agitator air may be drawn into said tubular portion to pass downwardly and then outwardly beneath said dasher portion into the material passing down through said openings.

2. Apparatus of the character described comprising a receptacle, an agitator therein, means for rotating said agitator, said agitator including a substantially flat radially extending dasher portion spaced from the receptacle bottom, said dasher portion having distributed openings therethrough, means for directing material upwardly adjacent the periphery of the dasher whereby said material flows inwardly and downwardly through said openings, there being lips on the dasher portion adjacent said openings extending upwardly in the direction of rotation of the agitator to aid the flow of material downwardly through said openings, a tubular portion extending upward centrally of said dasher portion, and said tubular portion having air admitting openings adjacent the top thereof and forming an air passage adapted to direct a current of air beneath said dasher portion, whereby on rotation of said agitator air may be drawn into said tubular portion to pass downwardly and then outwardly beneath said dasher portion into the material passing down through said openings.

JOHN M. CROWE.